(12) United States Patent
Kumar et al.

(10) Patent No.: US 9,984,338 B2
(45) Date of Patent: May 29, 2018

(54) REAL TIME E-COMMERCE USER INTERFACE FOR MONITORING AND INTERACTING WITH CONSUMERS

(75) Inventors: Amit Kumar, San Jose, CA (US); Kent Brewster, East Palo Alto, CA (US)

(73) Assignee: Excalibur IP, LLC, New York, NY (US)

( * ) Notice: Subject to any disclaimer, the term of this patent is extended or adjusted under 35 U.S.C. 154(b) by 17 days.

(21) Appl. No.: 13/227,458

(22) Filed: Sep. 7, 2011

(65) Prior Publication Data

US 2012/0296682 A1    Nov. 22, 2012

Related U.S. Application Data

(63) Continuation-in-part of application No. 13/181,381, filed on Jul. 12, 2011.

(60) Provisional application No. 61/487,237, filed on May 17, 2011.

(51) Int. Cl.
 *G06Q 10/00* (2012.01)

(52) U.S. Cl.
 CPC .................................. *G06Q 10/00* (2013.01)

(58) Field of Classification Search
 None
 See application file for complete search history.

(56) References Cited

U.S. PATENT DOCUMENTS

| | | | |
|---|---|---|---|
| 6,470,386 B1 * | 10/2002 | Combar et al. | 709/224 |
| 6,661,431 B1 * | 12/2003 | Stuart et al. | 715/733 |
| 6,704,732 B1 * | 3/2004 | Barclay | G06F 11/3495 |
| 7,623,650 B2 * | 11/2009 | Dalton et al. | 379/265.01 |
| 7,797,642 B1 * | 9/2010 | Karam et al. | 715/810 |
| 2002/0143619 A1 | 10/2002 | Laurie | |
| 2002/0188527 A1 * | 12/2002 | Dillard et al. | 705/27 |

(Continued)

OTHER PUBLICATIONS

WebTrends and Silverpop Integration Delivers a Powerful Marketing Solution, for Automated, Relevant and Targeted Email Messages, Nov. 8, 2007.

(Continued)

*Primary Examiner* — Stephanie Z Delich
(74) *Attorney, Agent, or Firm* — Mauriel Kapouytian Woods LLP; Adrew A. Noble; James Woods

(57) ABSTRACT

Systems and methods for e-commerce customer support activities are provided via an analytics server, which provides real-time information concerning customer visits to an e-commerce Web site to a merchant that operates the Web site, for example via a dashboard or other user interface. The real-time information allows the merchant to monitor and optionally interact with customers visiting the Web site, for example by viewing requests for customer service and providing real-time customer service via interactive user interfaces. Real-time telemetry concerning the customer visits is provided to the analytics server, which then presents the information in meaningful fashions via the dashboard or user interfaces for review by the merchant. Merchant responses to the information is facilitated via analytics engines, customer support engines, rule engines, deal engines, recommendation engines, and other components, which may operate according to customized rule sets to implement specific customer support policies.

20 Claims, 9 Drawing Sheets

(56) References Cited

U.S. PATENT DOCUMENTS

| | | | |
|---|---|---|---|
| 2003/0046389 A1* | 3/2003 | Thieme | 709/224 |
| 2003/0053615 A1* | 3/2003 | Anderson et al. | 379/265.09 |
| 2004/0010720 A1* | 1/2004 | Singh et al. | 713/201 |
| 2004/0249935 A1* | 12/2004 | Jackson | G06F 11/3006 709/224 |
| 2005/0120045 A1* | 6/2005 | Klawon | 707/102 |
| 2006/0004628 A1 | 1/2006 | Axe et al. | |
| 2006/0085420 A1* | 4/2006 | Hwang | 707/10 |
| 2006/0122917 A1* | 6/2006 | Lokuge et al. | 705/27 |
| 2007/0061412 A1* | 3/2007 | Karidi et al. | 709/217 |
| 2007/0071206 A1* | 3/2007 | Gainsboro et al. | 379/168 |
| 2007/0130090 A1 | 6/2007 | Staib et al. | |
| 2007/0162353 A1* | 7/2007 | Borders et al. | 705/26 |
| 2007/0288312 A1* | 12/2007 | Wang | 705/14 |
| 2010/0057556 A1 | 3/2010 | Rousso et al. | |
| 2011/0066497 A1 | 3/2011 | Gopinath et al. | |
| 2011/0093324 A1* | 4/2011 | Fordyce et al. | 705/14.27 |
| 2011/0185293 A1* | 7/2011 | Barnett et al. | 715/760 |
| 2011/0238478 A1* | 9/2011 | Gottfurcht et al. | 705/14.25 |
| 2012/0296697 A1 | 11/2012 | Kumar | |
| 2013/0018713 A1 | 1/2013 | Kumar et al. | |

OTHER PUBLICATIONS

Fueling Better Customer Interactions WebTrends © Analytics 9 (https://web.archive.org/web/20110228043038/http://www.ems-uk.com/webtrends/website.htm), 2010.

* cited by examiner

REAL TIME E-COMMERCE USER INTERFACE FOR MONITORING AND INTERACTING WITH CONSUMERS

RELATED APPLICATIONS

This application is a continuation-in-part and claims priority to U.S. application Ser. No. 13/181,381, filed Jul. 12, 2011 and claims priority to U.S. Provisional Application No. 61/487,237, filed May 17, 2011 the entire contents of which are incorporated herein by reference.

FIELD OF THE INVENTION

The present invention relates generally to the field of e-commerce systems and methods, and in particular to real-time systems and methods for monitoring, interfacing and interacting with online customers.

BACKGROUND

E-commerce, which generally refers to commercial activities online, is an area that is rapidly increasing in popularity as more and more customers purchase consumer items from Web sites rather the visit physical stores. There are several e-commerce Web sites that are devoted to commercial activities. For example, virtual stores such as Amazon™ have sophisticated Web sites that offer a wide variety of products for sale to consumers. Other Web sites provide more limited sets of specialty items and still others cater to business customers as opposed to general consumers. Some Web-based stores have physical world counterparts, but many do not. Irrespective of whether the Web-based stores sell to consumers or business or whether they are extensions of physical world stores or not, virtually all Web-based store owners have an interest in understanding who is visiting their Web site and what activities those visitors are engaged in during such visits.

This need for information regarding Web site visitors has spawned the industry of Web analytics. Broadly speaking, Web analytics may be regarded as the measurement, collection, analysis and reporting of data for purposes of understanding Web site usage. Such analytics are also used in connection with business and market research. Many Web hosting providers, such as Google™, Yahoo!™ and others, offer this kind of analytical information to their subscribers in connection with sites hosted for those subscribers. In particular, on-site Web analytics provide a Web site owner/operator with information regarding actual Web site visitor activities, but usually this is provided in the form of a compilation of historical information over various time periods/visits.

While somewhat useful, historical information provides only an after-the-fact view of visitor behaviors and has limited benefit for the Web site owner/operator. However, unlike real world physical stores, the Web site owner (or merchant) providing goods and services online cannot interact with customers in real time, and provide customer support to offer a personalized or customized shopping experience. While some online stores may have an online customer support chat feature, this requires the consumer to initiate a "call" with the merchant online, which is not much different than making a phone call to a customer support department via telephone. In these situations, the behind the phone, or behind the computer screen merchant has no information on the potential buyer, his browsing activity, or knowledge of who may be best suited to offer customer support to the buyer.

Also, a merchant of a real world store has the ability to monitor the traffic of his store at any hour and check the inventory as supply and demand for particular products increases or decreases. Traditional e-commerce Web sites do not provide the ability for merchants to monitor the trends, patterns or behavior of customers and react to customer demands and consumer trends in real-time.

SUMMARY OF THE INVENTION

Real time and rule based analytics, allowing direct visualization of consumer activity can greatly enhance the buying experience of customers and facilitate efficient sales for a merchant by allowing for real-time interactions with customers. Similar to entering a real world physical store, the buyer experience can be enhanced by a knowledgeable sales person that can make suggestions, recommendations and provide discounts or other incentives to a customer to close a sale.

An embodiment of the invention includes a real-time e-commerce system, which includes an analytics system with accompanying analytics database. An e-commerce Web site communicates over a network with said analytics system, and includes analytics software. A merchant administrator client communicates over the network with the analytics system and is capable of receiving analytics pages therefrom. The analytics pages provide real time news of customer activities at the e-commerce website. Client computers communicating with the e-commerce Web site are capable of displaying e-commerce Web pages to users of client computers.

Another embodiment of the invention includes an analytics system, with: an analytics server for communicating with an e-commerce Web site in real time; a rule engine for generating rules for the e-commerce Web site based on a real time analysis of user actions; a deal engine for generating promotions for a particular user of said e-commerce Web site, wherein said deals are based on a particular user's actions: a recommendation engine for generating recommendations to users of said e-commerce Web site based upon selections or preferences of the user; a front end server for communicating with said e-commerce Web site; a merchant dashboard engine for generating real-time analytics pages to the merchant on the activities of users of the e-commerce Web site; and a customer support engine for generating customized customer support interfaces. An embodiment of this system may also include a marketing engine for effecting real-time marketing decisions.

Another embodiment of the invention includes a real-time online customer support system, including: a plurality of customers devices communicating with an e-commerce Web site over a network, wherein said e-commerce Web site is coupled to an analytics system; which analytics system is for receiving information concerning said plurality of customers from said e-commerce Web site; wherein said analytics system generates an analytics user interface for a merchant device connected to the analytics server over a network, the analytics user interface includes analytics page and is capable of communicating the actions of customers in real-time; the analytics system is further capable of generating customer support web pages automatically or at the request of the merchant; and is capable of receiving and processing commands from said merchant device. The analytics system is also capable of generating personalized customer interfaces for said plurality of customer devices, wherein said merchant can interact with customer via user interfaces in real-time.

Another embodiment of the invention includes a method for real-time customer support, including the steps of: registering the login of a customer at an e-commerce Web site; receiving notification at an analytics system from an e-commerce Web site; searching for customer profile information; generating an e-commerce customer support user-interface; initiating a request for customer service; sending a customer service request to a merchant; interacting with a customer in real-time; purchasing a product based on real-time interactions; and generating an automatic recommendation for a customer.

In yet another embodiment of the invention, a computer implemented method includes the steps of: receiving notification of customers on an e-commerce Web site at an analytics system; providing customer profile information to a merchant of an e-commerce Web site; continuously monitoring each customer at said e-commerce Web site; generating merchant interfaces based on real-time consumer activity; automatically deciding whether a customer needs support; alerting the merchant of customer support needs; and initiating a customer support session between the merchant and the customer.

It will be appreciated that the invention is not limited to the embodiments described herein. Although the invention will described with reference to particular embodiments, the description is only an example of the invention's application and should not be taken as a limitation. Various adaptations and combinations of features of the embodiments disclosed are within the scope of the invention as defined by the claims. It should also be noted that embodiments of the present invention have been described with references to various software and hardware components, some of which are depicted in the exemplary figures. One of ordinary skill in the art will recognize that modem distributed computing systems allow software and/or hardware components to reside in different locations, servers, clients and/or hardware or firmware components without limiting the location or function of the software, firmware or hardware components as described with reference to the exemplary embodiments and figures.

BRIEF DESCRIPTION OF THE DRAWINGS

The present invention will be more fully understood from the following detailed description thereof, taken together with the accompanying drawings, in which.

DETAILED DESCRIPTION

Figure 1:
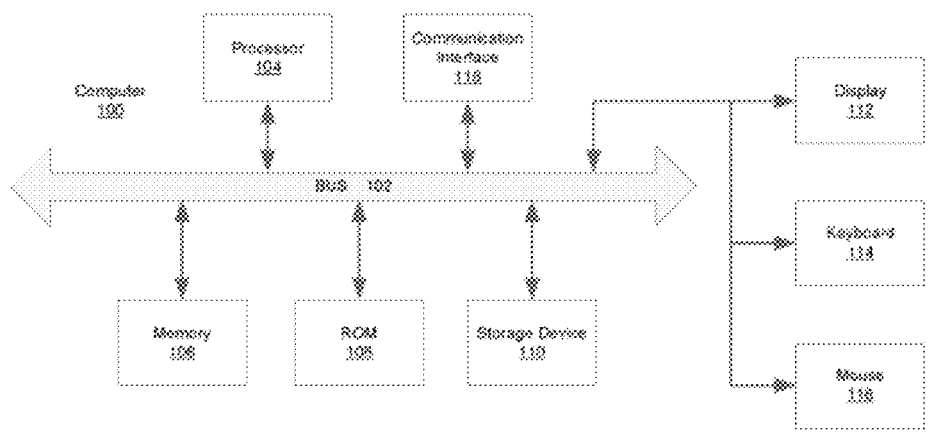
FIGS. 1 and 2 are examples of computer architectures for computer systems configured in accordance with embodiments of the present invention.

Embodiments of the present invention relate to real-time e-commerce systems and methods for monitoring, interacting and reacting to customer activities online.

The present inventors have recognized that historical Web analytic information does not afford a Web site owner/operator opportunities for direct and meaningful interaction with visitors to the Web site. For example, reliance on only historical information does not afford the owner/operator a chance to influence a purchase decision of a Web site visitor in real time. Nor does the historical information permit an owner/operator opportunities to provide valued clients of the Web site specialized services, personalized attention or promotions during a current visit to the Web site. Accordingly, the present inventors have recognized a need for providing systems and methods to enable Web site operators to interact with customers in real time, monitor virtual store activities in real-time, and provide customized promotions, deals, and recommendations to customers based on real-time data.

In various embodiments of the present invention, owners and/or operators of e-commerce Web sites (also referred to as "merchants") are provided access to an e-commerce analytics system which allows these merchants to view the activities of their customers as those customers are interacting with an online storefront through a merchant dashboard and, optionally, influence purchasing decisions of customers through interaction with the customers. The merchant dashboard is made accessible through a real-time analytics system via one or more computer networks. The analytics system can monitor the activities of individual customers and Web browsers that enter an online e-commerce Web site and then report the activities of individual customers to the merchant in real-time. The merchant, who is also connected to the network via a computer based device or platform, can monitor the real-time activities of the customers via the merchant dashboard (which may include one or more user interface screens) that provides detailed information concerning the customers visiting the merchant's Web site and the activities of those customers. The analytics system also has the ability to provide the merchant real-time information concerning the prices, supply and demand of various products and services on other e-commerce Web sites, or even physical stores, so the merchant can react in real-time to decide whether to adjust the prices of products and services offered through the merchant's site to meet market demands and/or provide customers visiting his/her online store special promotions and deals. Embodiments of the present invention are discussed below with reference to FIGS. 1-10.

Another embodiment of the invention enables a merchant to provide real-time e-commerce support to a customer visiting the merchant's e-commerce Web site. The analytics system acquires and monitors information of customers visiting an e-commerce Web site and stores customer information in an analytics database. Furthermore, the analytics system is able to provide virtual real-time graphical icons representing e-commerce customers to a merchant via a merchant dashboard. The merchant, who may be logged into the analytics system through a desktop, laptop, smartphone or portable computing device, may monitor the customer in real-time and provide customized support to the customer based on previously acquired customer profile information. In the case of a new customer, the merchant may receive notification of the new customer through the analytics engine, allowing the merchant to greet the customer and optionally provide a promotion or deal to the new customer as a means of enforcing a purchase.

One embodiment of the invention includes a system for real-time interactions with a merchant. The system provides automatic notification to a merchant through an e-commerce Web site connected to an analytics system. A customer support engine may provide user interfaces or objects to a customer that opts for customer support. Upon generating a customer/provider user interface, a communication channel is established between a live merchant using merchant interfaces and a customer at a remote computer or computing device. The customer may interact with the merchant/provider through the customer user interfaces, which may include chat-boxes, or graphical representations of the merchant. In some embodiments, merchant dialog is provided by digitized audio speech to a soundcard on the user's computer or mobile computing device. Other embodiments may include text-to-speech systems whereby the merchant can provide customer support by typing in merchant interfaces. The merchant's written text can be converted by the analytics system using text-to-speech software processing to deliver live auditory speech to a customer on the other end. In the same way the merchant's text can be converted to audio, the customer questions and inquiries via chat boxes or text entries can be converted by the analytics system to synthetic speech audio output to the merchant. It will be appreciated by one of ordinary skill in the art that conventional text-to-speech or speech-to-text software systems can be implemented for use in various embodiments of the present invention.

Another embodiment of the invention includes a rule-based system for providing automated customer support. The rule based system allows the analytics software to provide support or advice to a customer based on a number of factors, including time spent by the customer browsing the Web site, the number and type of products put into a customer's shopping cart, the number and types of products removed from a customer's shopping cart, and whether the customer has purchased a product/service or has visited the site before. The analytics system is able to gauge customer familiarity with the e-commerce site based on rules and algorithms to determine what level of support to provide the customer and/or whether the customer needs a product specialist. The analytics system also has the advantage of identifying the customer and automatically conveying the identity of the customer to the merchant so that the merchant can greet the customer at a personal level and provide customized support to repeat or high volume customers.

FIG. 1 illustrates an example of a computer system 100 on which any of the methods and systems of various embodiments of the present invention may be implemented. Computer system 100 may represent any of the computer systems discussed in connection with FIGS. 3-5 and, in particular, may represent a server, client or other computer system upon which e-commerce servers. Web sites, Web browsers and/or Web analytic applications may be instantiated. Computer system 100 includes a bus 102 or other communication mechanism for communicating information, and a processor 104 coupled with the bus 102 for processing information. Computer system 100 also includes a main memory 106, such as a RAM or other dynamic storage device, coupled to the bus 102 for storing information and instructions (such as instructions for e-commerce rules and promotions) to be executed by processor 104. Main memory 106 also may be used for storing temporary variables or other intermediate information during execution of instructions to be executed by processor 104. Computer system 100 further includes a ROM 108 or other static storage device coupled to the bus 102 for storing static information and instructions for the processor 104. A storage device 110, such as a hard disk, is provided and coupled to the bus 102 for storing information and instructions (such as computer readable instructions comprising the Web analytics engines, customer information, Web server, and user interfaces for the merchant dashboard, etc.).

Computer system 100 may be coupled via the bus 102 to a display 112 for displaying information to a user, however, in the case of servers such a display may not be present and all administration of the server may be via remote clients. Likewise, input device 114, including alphanumeric and other keys, may be coupled to the bus 102 for communicating information and command selections to the processor 104, but such a device may not be present in server configurations. Another type of user input device is cursor control device 116, such as a mouse, a trackball, or cursor direction keys for communicating direction information and command selections to processor 104 and for controlling cursor movement on the display 112. Such an input device may or may not be present in a server configuration.

Computer system 100 also includes a communication interface 118 coupled to the bus 102. Communication interface 118 provides for two-way, wired and/or wireless data communication to/from computer system 100, for example, via a local area network (LAN) or other network, including the Internet. Communication interface 118 sends and receives electrical, electromagnetic or optical signals which carry digital data streams representing various types of information and instructions. For example, two or more computer systems 100 may be networked together in a conventional manner with each using a respective communication interface 118.

Figure 3:
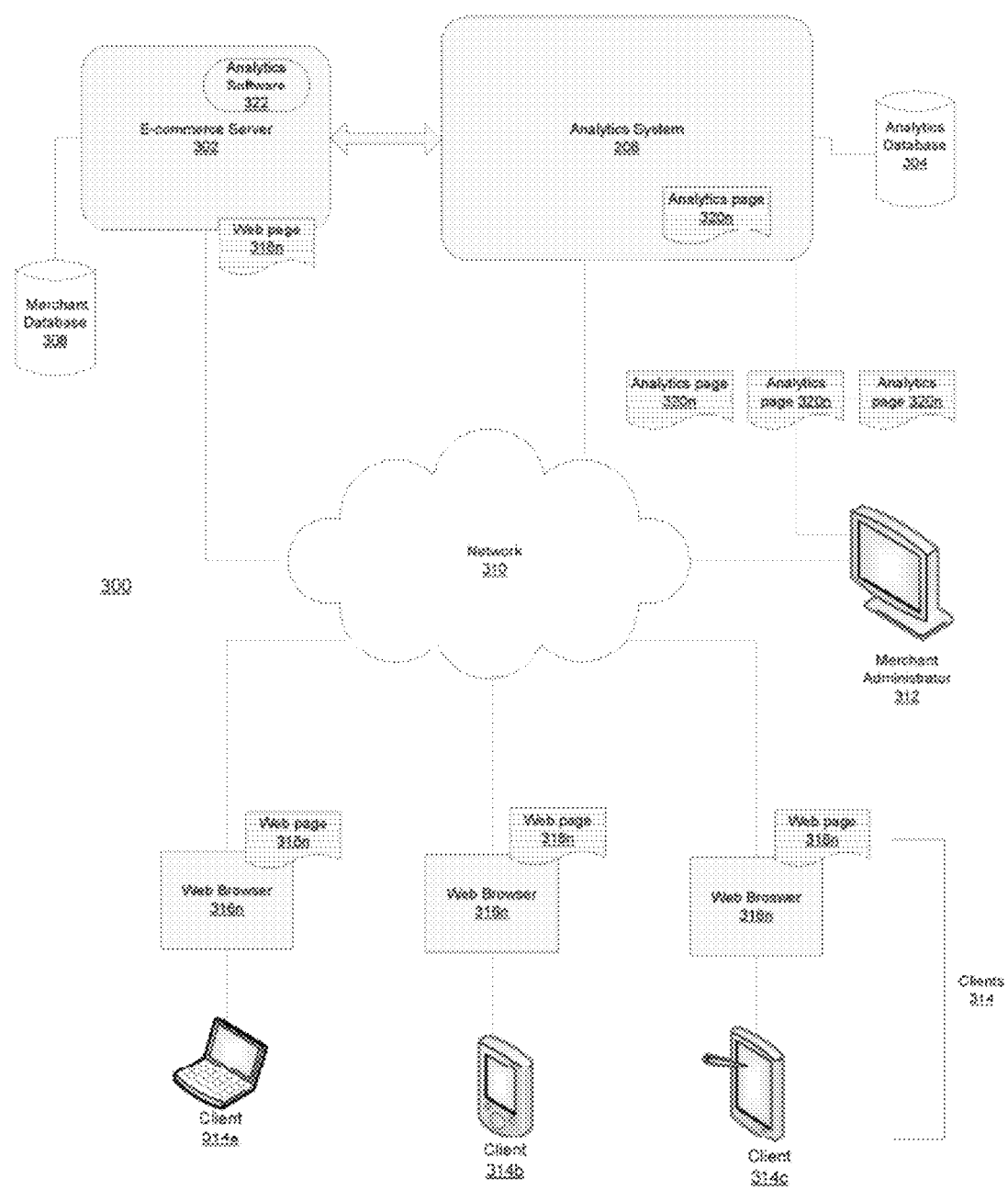
FIG. 3 illustrates components of a network architecture in which embodiments of the present invention may be implemented.

It will be appreciated that the Merchant Administrator 312, clients 314a-314c, and Web site e-commerce server 302, analytics system 208, and database 304 and 308 depicted in FIG. 3, can be implemented in computer system 100.

The various databases described herein are computer-based record keeping systems. Stated differently, these databases are each a combination of computer hardware and software that act together to allow for the storage and retrieval of information (data). Accordingly, they may resemble computer system 100, and are often characterized by having storage mediums capable of accommodating significant amounts of information.

Figure 2:
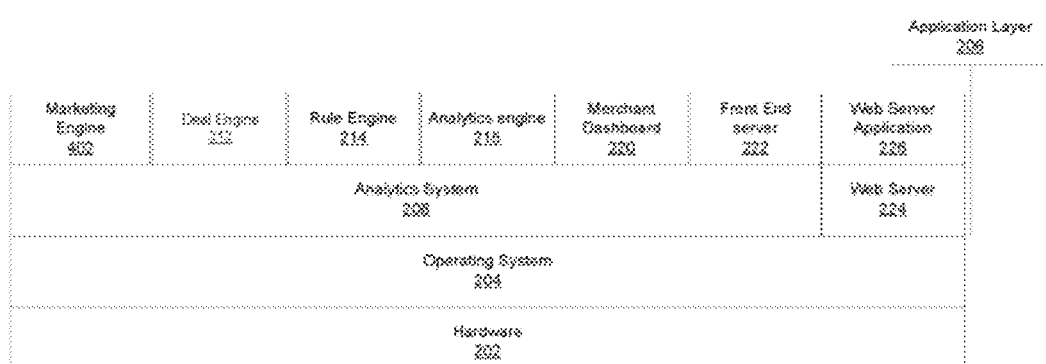

FIG. 2 illustrates a computer system 200 from the point of view of its software architecture, according to embodiments of the invention. Computer system 200 may be a server or a group of servers or computers. The various hardware components of computer system 200 are represented as a hardware layer 202. An operating system 204 abstracts the hardware layer and acts as a host for various applications 208-224, that run on computer system 200. In the case of analytics system 208, the operating system acts as a host for an analytics system 208 which communicates with merchant administrators 312 and e-commerce server 302.

The computer system may also include Web server 224. For Web server 224 the operating system may host a Web server application 226, which provides access for the client computers via Web browsers. In the case of a client system, the operating system acts as a host for a Web browser application 316. The e-commerce server 302 and e-commerce Web site 406 may run on Web server 224. In one embodiment the e-commerce server is remote to the analytics system and operates on a different group of computer systems. In another embodiment, the e-commerce system may include the analytics system. One or more Web servers may operate as part of analytics system 208 and Web site e-commerce server 302. The Web server(s) and e-commerce server 302 may be implemented in computer systems similar to computer systems 100 or 200.

The analytics system 208 comprises various software and/or firmware modules, including the deal engine 212, the rule engine 214, the recommendation engine 216, and analytics engine 218, merchant dashboard 220 and front end server 222. It will be appreciated that the analytics system and the various applications 212-226 can reside on a single server, or a group of servers or computers at various locations on a network. The applications 208-222 and 226 are explained in greater detail with reference to FIG. 4 below.

To better understand the context in which real-time analytics may be employed, consider system 300 illustrated in FIG. 3. Additional details of various components of this system are included in FIGS. 4 and 5.

Included in system 300 are e-commerce servers 302, each hosting one or more e-commerce Web sites. Each Web site may include one or more Web pages 318n. As mentioned above, the Web sites may be commerce sites in which visitors are engaged in some sort of on-line commerce, but the present invention is not restricted to use in connection with such sites. Hence, the Web pages may be associated with social networking sites, forums, blogs, content sites, etc. An e-commerce Web site may be setup by merchant administrator 312 or a business owner or any other person interested in selling products and services online. Examples of e-commerce Web sites include those operated by Amazon.com™, Overstock.com™ and E-bay.com™. However, it will be appreciated that present invention can be used with e-commerce Web sites operated by small businesses or individuals selling products or services online. The e-commerce server 302 may include Web page applications, Web pages, and e-commerce software for facilitating transactions with consumers online. however, in some cases aspects of these services will be hosted on other servers. For example, payment services may be facilitated through servers operated by payment fulfillment providers. Such details are not critical to the present invention. In general it is sufficient for purposes of the present discussion to assume that the e-commerce server includes a Web server (or Web applications) for hosting the e-commerce Web site's product Web pages. Usually, the e-commerce server 302 will also include or be associated with a merchant database 308 for storing customer and product information.

Also part of system 300 is an analytics system 208, hosting an analytics site which may be made up of a plurality of analytics pages 320n. The analytics pages 320n, some or all of which may comprise merchant user interfaces, are the means by which analytics information concerning visits to Web sites (e.g., e-commerce Web site 406, shown in FIG. 4) is conveyed to merchant administrators. Such information may be stored by analytics system 208 in an analytics database 304 that is communicatively coupled to the analytics engine 218. In some cases, the analytics pages may be presented to a merchant administrator 312 via a Web browser running on a client computer system as individual pages. Or, the analytics information may be presented via a single analytics dashboard, which itself is styled as an analytics user interface 514 (shown in FIG. 5). Often, some combination of these presentation mechanisms will be employed concurrently and so the particular user interface pages and layouts to be discussed below should be regarded only as examples of possible configurations and are not intended to limit the present invention unnecessarily.

The e-commerce Web sites 406 are accessed by users via client systems 314a-314c. The client systems may, in some cases, be computer systems, such as personal computers or the like, but more generally may be any computer-based or processor-based device that executes application software or embedded routines which allows the content of the Web site to be rendered for display to the user on a display device. For example, client systems may include computer systems, mobile devices such as iPads™, smart phones, mobile phones, etc., and the application software may be a Web browser 316 such as Microsoft Corporation's Internet Explorer™, Apple Inc.'s Safari™, or Google Inc.'s Chrome™, etc. Such applications are typically stored in one or more computer readable storage devices accessible to one or more processors of the subject client system and, when executed, cause the processor(s) to perform the operations necessary to render the subject sites/pages for display at the subject system (e.g., via a display device communicatively coupled to the processor).

The various constituents of system 300, including analytics system 208 and e-commerce server 302 are communicatively coupled to one another via one or more computer/data networks 310, which may include the Internet and other networks coupled thereto. The various computers, servers, routers, gateways, fiber optic cables, firewalls, wireless communication devices, radio towers and other networking devices which make up of network 310 and their precise hardware and software configurations is generally not critical to the present invention.

The analytics system 208 includes software and hardware for receiving communications from e-commerce server 302 and storing information in analytics system 208 and/or analytics database 304. The analytics system also communicates with merchant administrator 312 over network 310. The merchant administrator 312 may be a person using a desktop, laptop, server, mobile device or any other computing system that has sufficient computing resources to process and respond to information and instructions from analytics system 208. In other embodiments, the merchant administrator 312 may be an unmanned computer.

The analytics system 208 may store information on customers of or visitors to the e-commerce Web site, such as products previously purchased, previous visits to the Web site, pages accessed and viewed, and any other useful information on the customer such as product preferences, etc. This information may be stored in analytics database 304 and/or any other database including merchant database 308 for later data mining and customization of deals and promotions to customers. The analytics system communicates real time information concerning these customers and visitors and their activities at the e-commerce Web site, running on e-commerce server 302 to the merchant administrator 312. As discussed below, in some embodiments, this telemetry is facilitated via a cookie placed on the customer's/visitor's computer device.

As shown in FIG. 3, in one embodiment, e-commerce server includes analytics software 322 which may be installed by a merchant administrator 312 or analytics system 208, or any other person, entity or computer system implementing the present invention. In one embodiment, the analytics software installed on e-commerce server allows the e-commerce server to communicate directly with and transmit information to and from analytics system 208, and also receive information from customer computers interfacing with the e-commerce system.

FIG. 3 also depicts clients 314a-c which are typically used by consumers visiting e-commerce Web sites, such as e-commerce server 302. Clients 314a-c may consist of computing devices, such as a computer 314a (laptop or desktop), a smartphone 314b, or a tablet or other portable computing device 314c (such as the Apple i-Pad™). Clients 314a-c are employed by various consumers who visit e-commerce Web sites hosted by e-commerce server 302. As shown in this embodiment, the clients 314 include Web browser 316n (or other software) for visiting e-commerce Web sites. The Web browsers used in embodiments of the invention may include, for example, Microsoft Explorer®, Fire Fox®, Netscape Navigator®, Apple Safari® and Google Chrome™. The Web browsers may be configured to allow the receipt of cookies and/or other files for monitoring the activities of Web browsers 316 and/or clients 314a-c on e-commerce Web sites. As shown and depicted in FIG. 3, the e-commerce server transmits Web pages 318n (such as product Web pages) to the Web browsers 316n.

In one embodiment, consumers or customers desiring to visit an e-commerce Web site use clients 314 and Web browsers 316n to visit or log into e-commerce server 302 with the e-commerce Web site. In one embodiment, upon logging in, the e-commerce server 302 and/or analytics system 208 determine whether the customer has previously logged in or registered with the Web site. If the customer is visiting the e-commerce server 302 for the first time, the analytics software 322 and/or other software or application on the e-commerce Web site is notified of the new customer (which may be identified by its client Internet Protocol (IP) address, computer media access control (MAC) address, registration information, or other information) that identifies the client 314 as a new customer or visitor of the e-commerce Web site. The customer information will be stored at the analytics system 208 and/or e-commerce server or merchant database 308. It will also be appreciated that each time a new customer or previous customer visits the e-commerce server the analytics system 208 receives notification of the customer activity.

In another embodiment of the invention, the analytics system 208 will receive information on the login of clients 314a-314c. For example, cookies, or other software may be installed or present on customer client devices that communicate directly with the analytics system to provide the merchant administrator real-time access to information on the customers visiting the e-commerce Web site 406.

According to one embodiment of the invention, if a new or previous customer is identified, the e-commerce server, using analytics software 322, may transmit a cookie or (other monitoring file) to the client Web browser 316. The cookie or monitoring file is used to transmit information from client devices and/or Web browsers 316n to analytics system 208. The information transmitted includes the activities of the customer and the interactions of the customer with the e-commerce Web site. For example, each time the consumer visits the e-commerce Web site, views a product page, puts an item in a shopping cart, removes an item, purchases an item, or takes any other action on the e-commerce Web site, such information is transmitted to the analytics system 208.

The consumer actions taken on e-commerce Web site are sometimes referred to herein as "real-time consumer activity". The real-time consumer activity from clients 314a-c or Web browsers 316n may be transmitted directly to the analytics system 208, for processing and display to merchant administrator 312, over the network 310, or alternatively transmitted to the e-commerce server and then routed to analytics system 208 by analytics software 322 or other applications on the e-commerce server that are in communication with analytics system 208, for eventual processing and display to the merchant administrator 312. According to one embodiment, each time a new visitor or customer enters an merchant's e-commerce Web site, the analytics system is alerted through a notification. The notification may be transmitted through an electronic signal, a message, a data package or another form of computerized communication known to one of ordinary skill in the art. In this way, the analytics system can begin monitoring the customer's activities on the Web site for real-time reporting to the merchant administrator to be discussed in further detail below.

It will be appreciated that clients 314a-314c may have Web browsers 316n which may periodically or upon command delete cookies or other files received from the Internet. Accordingly, embodiments of the present invention allow the e-commerce server to transmit the cookie or monitoring file to the client 314 each time a consumer logs into the e-commerce server. This will ensure that the analytics system can receive information on the activities of consumers visiting the e-commerce Web site. In other embodiments, the e-commerce Web site may enable the use of cookies on the consumer's client device, depending on whether the use of cookies or other Internet files that transmit information over a network is enabled on the device. The commerce server and/or analytics software on the e-commerce server may also prompt the consumer to turn on cookies when the user visits the Web site to ensure that the user can experience an optimal real-time online shopping experience and qualify for promotions and deals.

In other embodiments, it may not be necessary to employ a cookie or monitoring file for transmitting information to the e-commerce server 302 and/or analytics server 208. It is also possible that the consumer visiting an e-commerce server can register with the Web site and obtain a user name/password for subsequent recognition by the e-commerce server upon login. In this situation, the analytics system can track the user's real time consumer activity through the login session with or without cookies being transmitted to the user's computer.

According to one embodiment, the merchant administrator 312 is also connected to the real-time e-commerce system by network 310. The merchant administrator may be a business owner, operator, employee or other person interested in viewing the activities of online customers and interacting with e-commerce customers in real time. In one embodiment, the merchant administrator 312 is the merchant who owns or operates the e-commerce Web site hosted on e-commerce server 302. The merchant administrator may access the services of the analytics system 208 using any suitable computing devices with a network connection, such as a desktop, laptop or mobile computing device connected to the Internet In one embodiment, the communications between the merchant administrator 312 and the analytics system 208 are bi-directional. The merchant administrator may log into the analytics system 208 using a unique user name and password provided by the analytics system. In one embodiment, the merchant administrator uses a Web browser to access the analytics system 208. In other embodiments, the merchant administrator may use an application residing on the merchant's computing device that communicates with the analytics system. The merchant administrator is able to monitor and track the activities of customers to the merchant's e-commerce Web site through the analytics system 208, which as discussed above, receives real-time information on clients 314a-c that are visiting and interacting with e-commerce server 302.

According to one embodiment, the analytics system 208 includes a merchant dashboard engine 220 (shown in FIG. 4) which provides the merchant administrator user interfaces for monitoring and viewing the real-time consumer activities of individuals (clients 314a-c). As shown in FIG. 3, the analytics system 208 provides analytics pages 320n to merchant administrator over the network. The analytics pages 320n (described in further detail in reference to FIGS. 9 and 10) include information such as the number/identity of customers currently visiting the e-commerce Web site, the number/identity of customers currently "browsing" for products, the identity of the products which the customers are browsing, the number/identity of customers putting items into a virtual shopping cart, the number/identity of customers who have purchased products or services, and an identification of the products and services customers have purchased. In addition to receiving information from the analytics system for viewing real-time consumer activity, the merchant administrator 312 can also send commands and instructions to analytics system 208, such as defining rules for customer promotions and deals that are discussed in further detail below.

Figure 4:
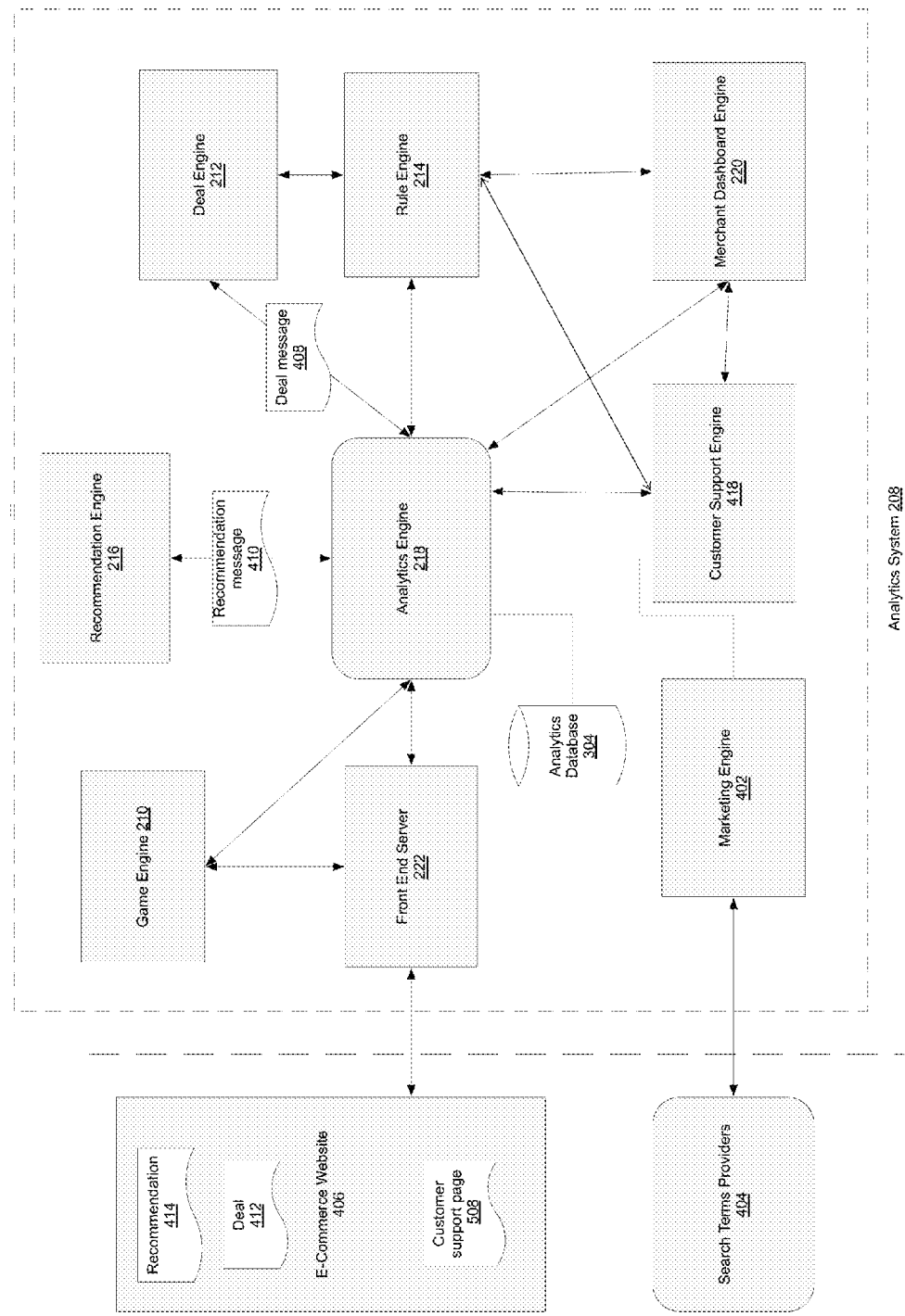
FIG. 4 illustrates components of an analytics system configured according to embodiments of the invention.

FIG. 4 shows an embodiment of the analytics system 208. The analytics system includes various software modules and databases for processing real-time consumer activity, including deal engine 212, rule engine 214, recommendation engine 216, analytics engine 218, analytics database 304, merchant dashboard engine 220, front end server 222, marketing engine 402, customer support engine 418 and game engine 210. In one embodiment, the analytics system 208 communicates with e-commerce Web site 406, to provide real time information on customers visiting e-commerce Web site. According to one embodiment, the e-commerce Web site communicates with front end server 222. The front end server 222 may be a Web server or communications server for processing commands, instructions and data to and from analytics engine 218 or any other component of the analytics system 208. According to one embodiment of the invention, the front end server 222 may be responsible for all incoming and outgoing communications with e-commerce Web site 406.

According to one embodiment, at the core of the analytics system 208 is the analytics engine 218. In one embodiment, the analytics engine receives data and information from the e-commerce Web site 406 and/or clients 314a-c, concerning the real time consumer activities occurring on an e-commerce Web site. Real-time analytics information, including customer information is stored in analytics database 304. For example, when a customer visits e-commerce Web site 406, the analytics engine will receive a notification or alert of the customer from the e-commerce Web site. The analytics engine can use the information to determine whether the customer is a first time customer or a new customer and update the analytics database accordingly. The analytics engine can also check with the rule engine 214, deal engine 212 or the recommendation engine 216, to determine whether there are any rules, deals or recommendations that should be provided to the customer on the e-commerce Web site for display on Web browsers 316n.

In one embodiment of the present invention, the analytics engine 218 is also a data mining center that is capable of receiving information from other Web sites, databases and information centers in order to monitor general consumer trends or activity on the Internet. This information may be communicated to merchant administrator 312 via merchant dashboard engine 220. The merchant administrator then has the option of changing the offerings on e-commerce Web site 406 in real-time in order to react to market and consumer trends.

According to one embodiment, the rule engine 214 includes instructions and data to define certain rules for e-commerce Web site 406. For example, the rule engine may include instructions to change the price or offer a discount to customer if the customer buys a certain number of products from e-commerce Web site or visits the Web site a certain number of times. In other embodiments, the rule engine may contain rules to offer discounts on holidays or other occasions. Also, the rule engine may be dynamic in that it may adapt to trends or events. For example, a rule may be set to offer discounts on "team A" jerseys if team A wins the national championship of a sporting event. In this case, the rule engine would receive real-time feedback from the analytics engine 218 which is configured to receive information and mine data on events of interest such as sporting events, elections, concerts, news, and customer trends and consumer habits. The rule engine may also define whether recommendations should be made for certain products. The rule engine 214 communicates directly with the analytics engine 218, which processes the rules to determine whether to invoke a deal or recommendation from the deal engine 212 and recommendation engine 216.

In one embodiment of the invention, the rule engine 214 is configured to provide rules on customer support. A customer visit or a customer request can trigger a pre-programmed rule that determines the level of the customer support. The rule engine allows the analytics system to automatically determine whether a customer requires support and also whether a merchant should be notified of a specific customer or purchase. For example, there may be a rule for repeat customers that provides the customer with automatic greetings and priority access to merchants and customer support specialists. In one embodiment, the rule engine maintains a hierarchy of support levels that determines the level of support based on customer status or purchasing activity. For example, a customer who purchases over $1000 in merchandise may trigger a notification to an assistant manager. The notification can be sent to the assistant manager by SMS, email or instant message, alerting the manager that he should pay special attention the customer.

In one embodiment of the invention, the customer support engine 418 is responsible for generating real-time customer support pages such as customer support page 508 depicted in FIG. 4. The customer support engine 418 is communicatively coupled to the analytics engine 218 and the rule engine 214, and is capable of generating customer service graphics and visual icons for the consumer, that may be rule based or specified manually by the merchant, through the merchant dashboard engine. The customer support engine 418 may also process customer inquiries and real time requests from the customer and forward the requests to the merchant via the merchant dashboard engine 220. Alternatively, the customer support engine can forward the requests and inquiries to the analytics engine to check with the rule engine to determine whether an automated response is available for the customer that would not require a live merchant.

In one embodiment, the merchant dashboard engine 220 is communicatively coupled to the customer support engine

418, allowing for real time merchant-to-customer interactions. The merchant dashboard engine 220 receives consumer inquiries and requests via the customer support engine 418, and displays the requests to a merchant in text or graphical form. The merchant or customer can then initiate a communications session over the network through e-commerce Web site 406 and "chat" with the customer through dialog boxes or display messages to the customer providing feedback, recommendations and responses to the customer direct inquiries or web browsing habits. In one embodiment, the merchant may send the desired product or service web page automatically to the customer and present the customer with the purchase screen for the product that the customer desires, obviating the need for the customer to browse through web pages or search for the desired web page. Real-time interactions manipulating the web browser to display customized pages or specific product web pages can be controlled by a live merchant using, for example, cookies placed on the customer's computer or through specific and authorized communications sessions using software such as Netmeeting™ (or any other comparable software known by one of ordinary skill in the art).

According to one embodiment of the present invention, the deal engine 212 generates specific deals and promotions based on the rules or information received from the rule engine 214 or analytics engine 218. The deal engine may generate a deal message 412, which may be any command or data instruction to be sent to the e-commerce Web site 406, and subsequently displayed to visitors of e-commerce Web site, such as clients 314*a-c*. The deal message 412 may be customized for a particular customer based on feedback from the analytics engine 218 and/or rule engine 214 such that a command may specify that certain deals and promotions be made available to repeat customers, new customers, or randomly selected customers.

It will also be appreciated that the merchant can customize deals as the merchant views the customer real-time consumer activity. This can be accomplished, for example, by specifying or changing the rules, or sending a command from the merchant dashboard engine 220 which will be relayed through the analytics system to the e-commerce Web site 406. It should be noted however, that a deal can be generated in a number of different ways, both manually and automatically, according to present embodiments of the invention. The generation of deals in real-time is particularly advantageous to the merchant. For example, while the merchant monitors the traffic to his e-commerce Web site, the merchant may notice a spike of activity and visitors on his site at a particular time of day. The merchant can react quickly to the increased traffic to his Web site by instructing the deal engine to 212 to send a deal message 408 to all customers currently on the Web site and further specify that the deal will expire in any given time period (e.g., in one hour) from the time it first appears on the e-commerce Web site 406.

The following example, according to an embodiment of the invention, illustrates how a "deal" may be generated for a customer of an e-commerce Web site. Consider an e-commerce Web site that provides art, posters and prints. The e-commerce Web site 406 is connected to the analytics system 208. The customer visits the e-commerce Web site 406. The customer desires to buy prints for his office or home and is particularly interested in jazz album art covers. Based on the pages visited and the search terms entered by the customer of the e-commerce Web site, the analytics engine 218 determines that the customer has a particular preference for classic jazz musicians Miles Davis and John Coltrane. In this example, if the customer puts more than 3 prints in his or her virtual shopping cart, a rule specified by the rule engine 214 may trigger a deal for "buy 3 prints and get one free". In addition, the merchant, through the merchant dashboard engine 220, may see that the customer is interested in jazz, and in particular, Miles Davis and John Coltrane. Based on this real-time knowledge, the merchant may make an instant deal to the customer for a free John Coltrane album art print when the customer puts 3 or more items into his shopping cart. The merchant can accomplish this in any number of ways by using the merchant dashboard engine 220 to interact with the rule, engine, deal engine or analytics engine. Unlike conventional systems, this generation of customized and real-time deals can influence purchasing decisions in real-time.

In one embodiment, the recommendation engine 216 is also a part of the analytics system 208. The recommendation engine can generate recommendations, such as recommendation message 410, which includes a recommended product, service or related product that is based on the user's decision to purchase or tentatively purchase (by placing item in virtual shopping cart) a product or service from the e-commerce Web site 406. The analytics engine 218 can receive feedback on the user's purchases or tentative purchase decisions and transmit this information to the recommendation engine 216 and/or the deal engine 212, to determine whether there is a recommendation and/or deal available for the customer. For example, a customer purchasing a laptop may also be interested in laptop cases and/or hardware and software upgrades to the base model. In this case, the recommendation engine can make additional product recommendations or upgrades which will be generated and sent to the user of the e-commerce Web site.

The analytics system may also include a game engine 21041-4. The game engine can generate games on the e-commerce Web site 406 that can be played by a customer using a Web browser or other appropriate software. The games may be used by the analytics system to award customers with points that can be accumulated and used for future visits to the Web site and also to unlock deals that may be awarded to the customers upon use, completion or achievements. It will be appreciated that any suitable game that can operate on a Web page known to one of ordinary skill in the art (e.g., using JavaScript) can be employed in the embodiment of the present invention. It will also be appreciated that the games on the Web site may consist of having the user visit certain pages or a click on certain icons in order to activate promotions. In a simple embodiment, the game may consist of having the consumer take certain steps on the e-commerce Web site to unlock promotions and deals. For example, a deal or promotion may be unlocked when a consumer visits the most popular product pages, products on sale, or new products. These type of consumer interactions with the Web page may be provided to unlock special deals.

Marketing engine 402 may also be implemented in certain embodiments of the invention. The marketing engine is useful for marketing the merchant's e-commerce Web site or other merchant promotions on the Internet. In one embodiment, as shown in FIG. 4, the marketing engine may bid on certain search terms with search term providers 404, such as Google™, Yahoo™, Facebook™ or Microsoft Bing™. The marketing engine may be configured to bid on terms based on rules specified by the rule engine 214 and data provided by the analytics engine 218. For example, consider the situation where "Team A" wins a national championship. If the merchant is in the business of providing sports apparel, the marketing engine, based on real time feedback from the analytics engine 218 and/or rule engine 214, will begin bidding for search terms such as team name, players names, franchise names, or jersey numbers of certain players to increase the overall presence of the merchant's e-commerce Web site on the Internet when users search for sports apparel of "Team A".

Another way in which the marketing engine can be used is based on real-time feedback to the merchant of activity on the merchant's e-commerce Web site 406. For example, increased traffic on pages for Team A apparel or placement of Team A apparel in virtual shopping carts, can prompt the merchant to instruct the marketing engine 402 to begin bidding on search terms related to Team A. The ability to react to user trends and news in real time provides the merchant with an advantage over conventional e-commerce system. The market for search terms is very competitive and terms can be bid up very quickly in response to consumer trends or preferences. Accordingly, rather than relying on analytic Web site data that is days or weeks old (historical data), embodiments of the present invention allow a merchant to make real-time decisions based on real-time data and capture an advantage over his competitors in both advertising and search term bidding. It should be noted that the marketing engine may include functionality for other uses, such as running Internet advertisements on certain Web pages, or requesting that certain advertisements for the e-commerce Web site 406 be run one or more relevant Web sites. For example, in one embodiment, the marketing engine is configured to place ad requests to popular Web sites such as ESPN.com or the Sports section of various national newspapers in response to real-time sports news. Based on real time analytics, the ad requests from the marketing engine can seek advertisements for currently popular items such as Team A jersey or any other relevant items for a winning or popular team.

In other embodiments, the marketing engine is sensitive to activity on the e-commerce Web site 406. Upon a certain threshold of interest or purchasing activity being reached, the marketing engine, might, for example, request that a "sale on Team A jersey" ad be run on various Web sites. This may be accomplished automatically by the generation of an e-mail message or other electronic communication over the network to the relevant advertising agency or Web site operator. It will also be appreciated that the ad to be run on other Web sites can be placed automatically on the site directly without any interaction with a person or third party. For example, Web sites such as Yahoo™ have application programming interfaces (APIs) that allow merchants to place an ad automatically on Yahoo Web sites. Thus, it is contemplated that the marketing engine can interact directly with other Web sites or search engines to have ads placed automatically upon a certain criteria being satisfied.

Figure 9:
FIGS. 9-10 illustrate examples of user interfaces for real time Web analytics information in accordance with various embodiments of the present invention.
Figure 10:
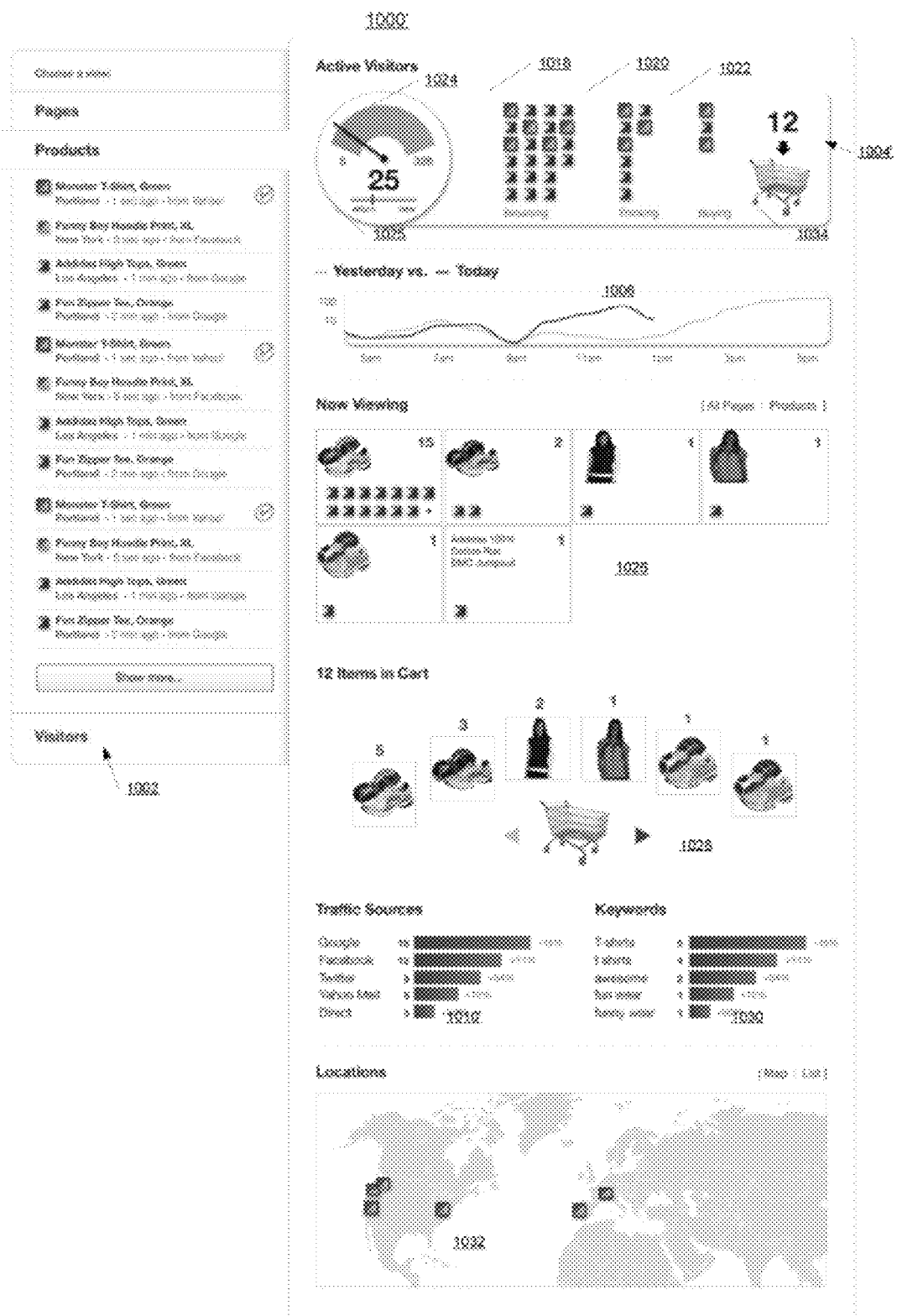

According to one embodiment, the merchant dashboard engine 220 is incorporated into analytics system 208 as shown in FIG. 4. The merchant dashboard engine presents real-time analytics information to the merchant connected to the analytics system. The merchant dashboard engine 220 receives real-time analytics information from the analytics engine 218 and creates interactive user interfaces for the merchant administrator. Examples of user interfaces generated by the merchant dashboard engine are shown in FIGS. 9 and 10. The merchant dashboard can generate, among other things, a display, in real-time of the number and identity of customers visiting e-commerce Web site 406 and the number of customers actively browsing or purchasing items from the Web site. The merchant dashboard may also generate graphs, charts and live icons that represent real-time consumer activity. It will also be appreciated that the merchant dashboard is configured to receive communications and commands from merchant administrator 312 over the network. The merchant administrator may specify or change rules, create deals and promotions, or provide instructions to the marketing engine 402. In one embodiment, the merchant dashboard provides merchant interfaces for facilitating live customer support. The dashboard may include functionality for generating notifications, changes in the icons representing the customer, or even generate pop-up boxes or chat-boxes whenever consumers login to the e-commerce Web site.

Figure 5:
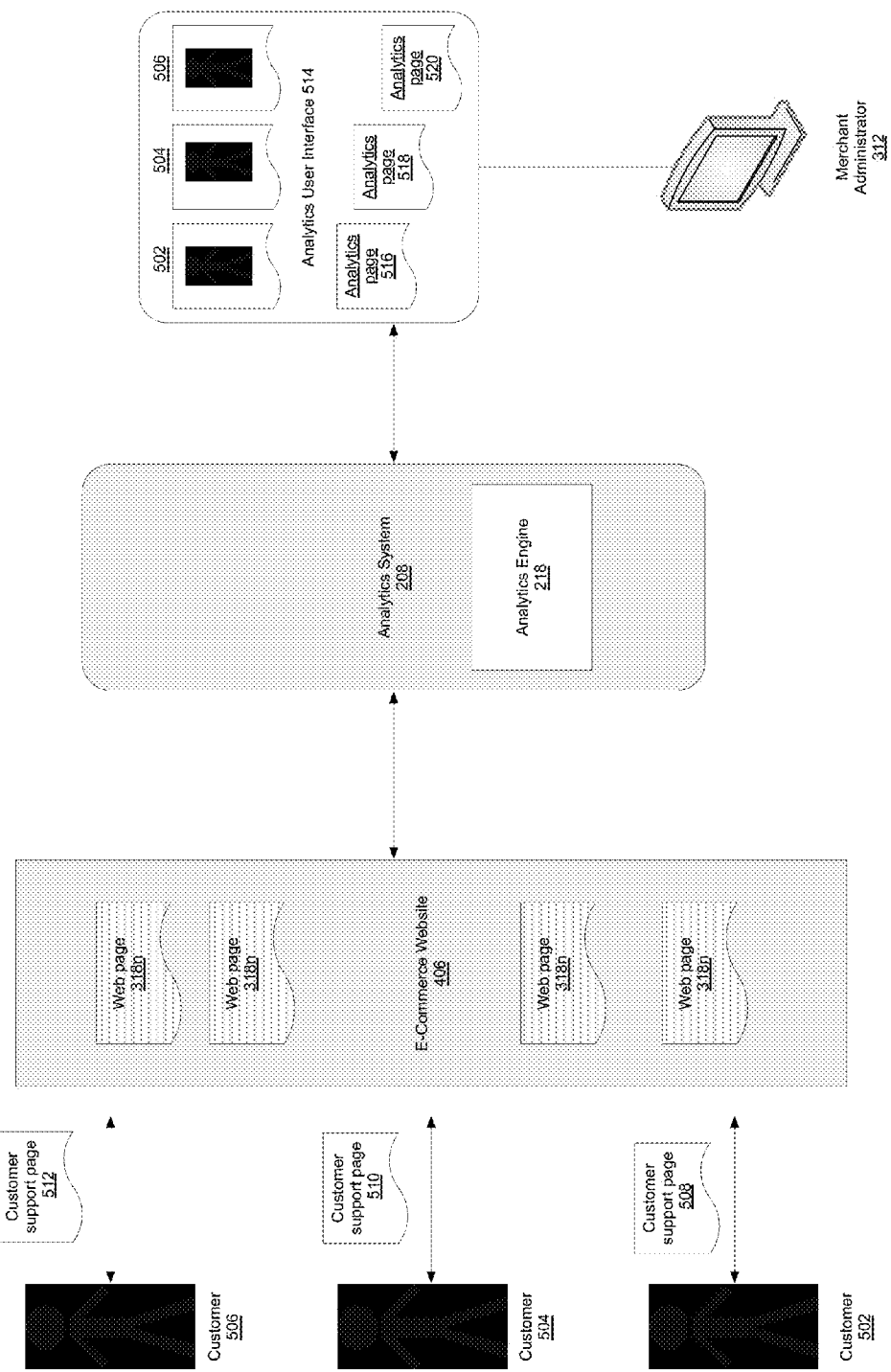
FIG. 5 is an example of a real-time e-commerce system configured according to embodiments of the present invention.

FIG. 5 depicts a system for real-time customer support in an e-commerce environment. Shown in FIG. 5 are exemplary customers 502-506. Customers 502-506 may be browsing web pages 318*n* on e-commerce Web site 406, which is communicatively coupled to the analytics system 208. The analytics system generates analytics user interface 514 in the form of analytics pages 516-520 that are continuously updated and rendered in a web browser or software application to merchant administrator 312. Customers 502-506 may browse product web pages 318*n* and request customer support via interactive icons or objects on the e-commerce Web site. The request for customer service is transmitted to the merchant administrator, who, in one embodiment, is notified of the request through analytics user interface 514. In one embodiment, the merchant administrator may provide customer support using portable devices such as an i-Phone™ that is capable of supporting an application according to embodiments of the present invention. In some embodiments, the customers 502-506 are graphically and visually represented to the merchant administrator as shown on analytics user interface 514. The graphical icons may further show the state of the customer, such as "browsing," "buying," "thinking," depending the nature of the customer activity, as further depicted in FIG. 10. By providing real-time information and analytics on current visitors to the merchant's e-commerce Web site, the merchant may directly interact with customers 502-506 by instructing the analytics system to render customer support pages 508-512 which are customized for consumers 502-506, respectively. For example, a repeat customer whose has opted for customer support service by clicking on objects on the e-commerce Web site or based on other predetermined preferences, can trigger a notification to the merchant administrator 312 through such activity. The merchant may in turn command the analytics engine 218 to provide customer support page to the consumer that includes a customized greeting, such as "Hi, Bob, I see that you have returned and are making another purchase of paper. Can I assist you with anything else? Would you be interested in a special promotion we are having today?" Such messages can be typed or spoken by the merchant administrator and delivered to the consumer in real time through customer support page. Alternatively, the system may be automated to provide such messages depending the rules set by the merchant administrator.

In one embodiment, the analytics system may upload information on customers 502-506 from sources such as the user's email account, Facebook™ page, LinkedIn™ account, Google+™ or any other social or professional networking site which allows for communication of customer information with the analytics system. Based on the information provided by these third party sources, the analytics system may create specialized or customized rules for the customer that enable the merchant to efficiently recognize the preferences and purchasing habits of certain customers. For example, the merchant may be alerted via analytics user interface that a customer is a "sports fan" and in particular, a "Giants baseball fan." With this information, the merchant can customize certain deals and promotions or provide specific customer support to the consumer who appears to be browsing for sporting merchandise. In one example, the merchant may say, "Hi Joe, I see that you like the Giants. I will give you a special deal today. If you purchase a Giants jersey in the next 10 minutes, I will give you a free Giants baseball cap." Through this personalized and real-time customer interaction, consumers are given the same level and quality of service they would receive if visiting a live store and meeting a merchant in real life.

Figure 6:
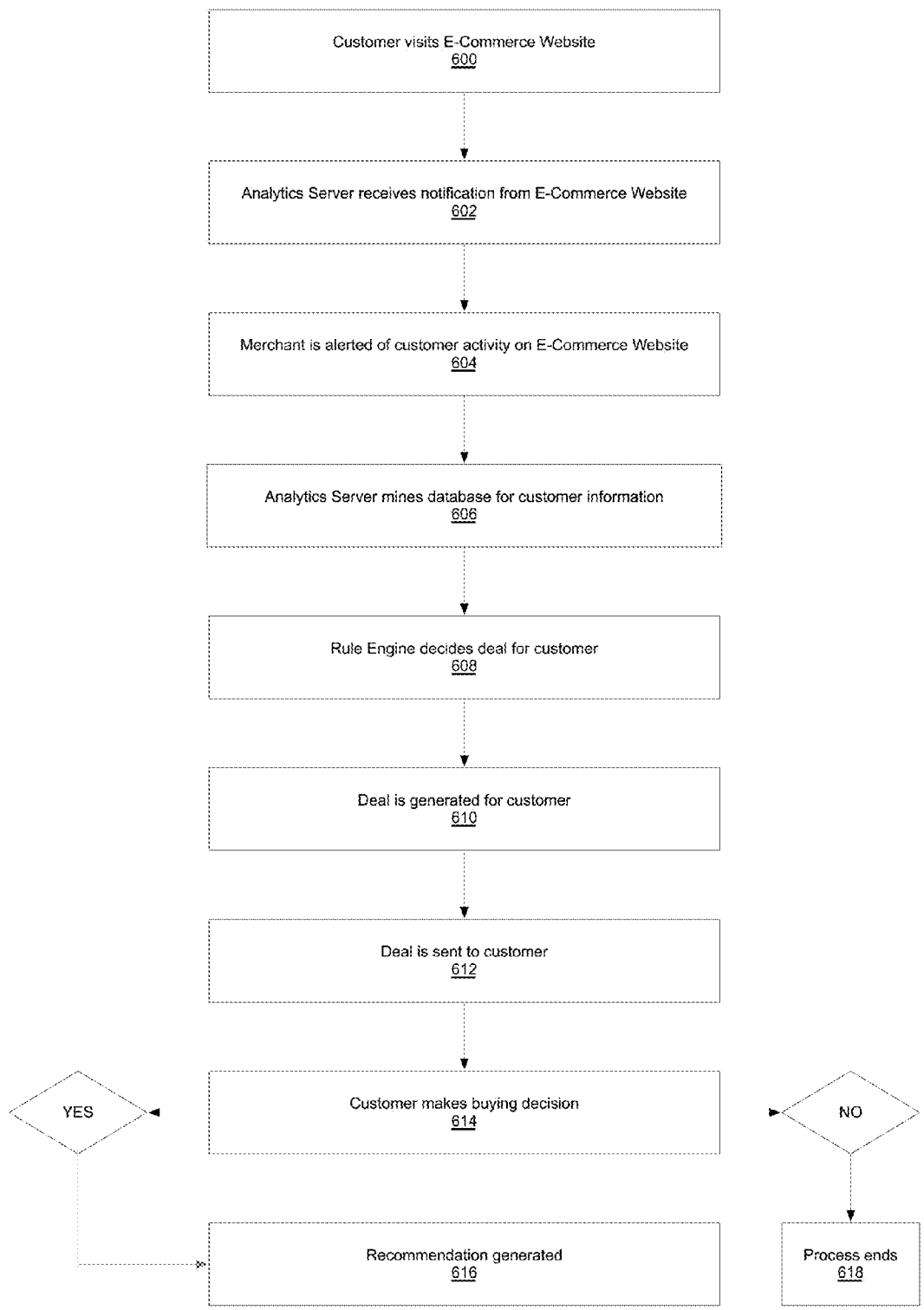
FIG. 6 is a flow diagram of a method for generating automated e-commerce promotions according to embodiments of the present invention.

FIG. 6 is a flow diagram showing a method according to one embodiment of the invention. In step 600, the customer visits the e-commerce Web site. In step 602, the analytics server receives a notification from the e-commerce Web site regarding the customer's presence and/or activities on the e-commerce Web site. In step 604, the merchant is alerted of customer activity on the e-commerce Web site. In step 606, the analytics system stores customer information. In step 608, the rule engine decides a deal for the customer. In step 610 a deal message is generated for the customer. In step 612, the deal is sent to the customer. In step 614, the customer makes a buying decision. If the customer decides to make a purchase, in step 616 a recommendation for other products or services is generated. If the customer does not make a purchase, in step 618, the process ends.

Figure 7:
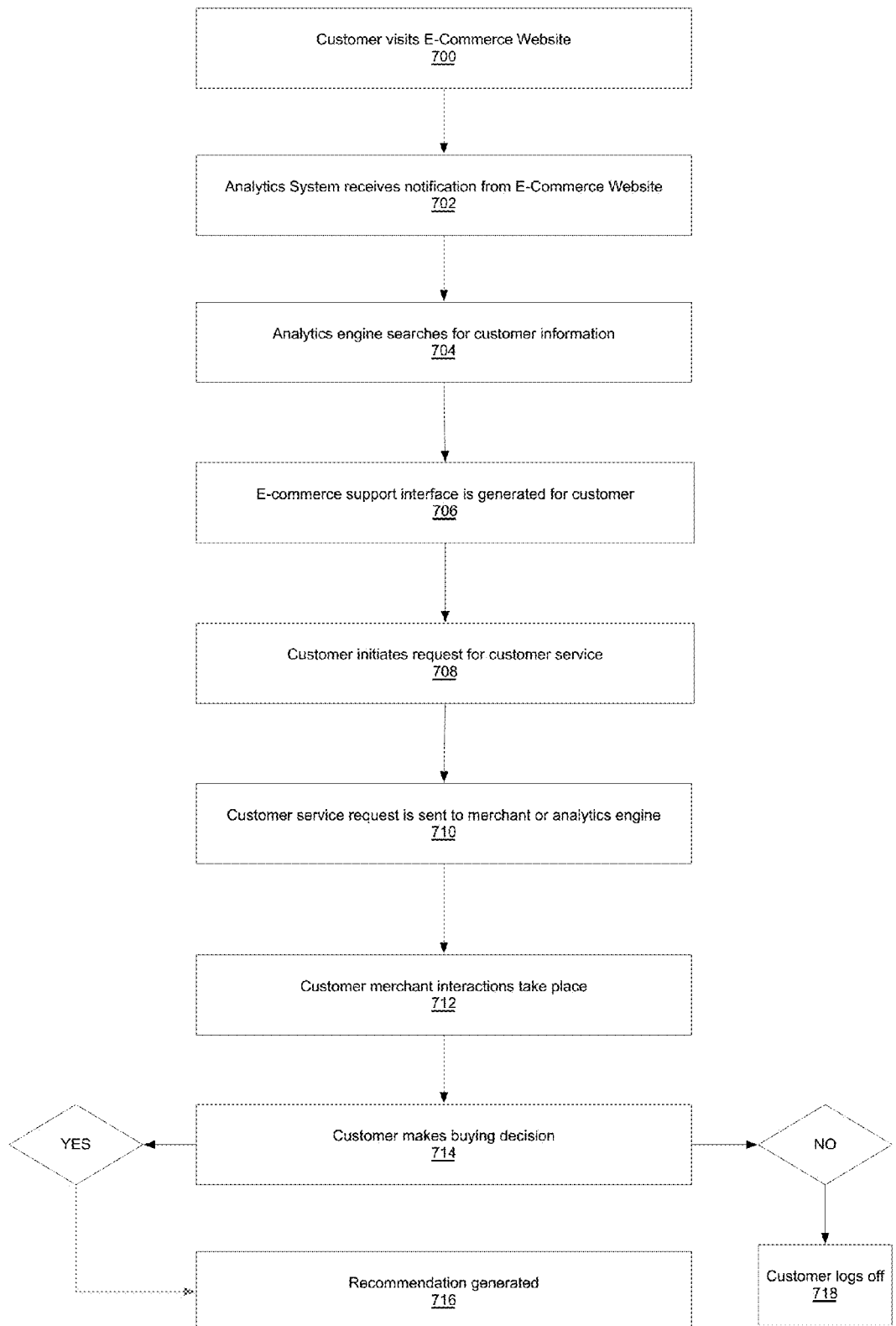
FIG. 7 is a flow diagram depicting a method for supporting real-time customer support in an e-commerce environment according to one embodiment of the invention.

FIG. 7 depicts a flow diagram of a method for real-time customer support according to one embodiment of the invention. In step 700 the customer visits the e-commerce Web site. In step 702 the analytics system receives a notification from the e-commerce Web site registering the presence of a customer. In step 704 the analytics engine searches for customer information in its database. It should be noted that in this step the analytics engine can also make a determination of whether the visitor is a first time visitor of the e-commerce Web site, a previous visitor or a previous customer. This information can be used to develop the level of customer support for the e-commerce consumer. In step 706, depending on the analysis of the customer profile information, an e-commerce support interface may be generated for the customer. Through the interface, in step 708, the customer may request customer service. It should be noted that this step can take place without the generation of a specific interface through a icon on the e-commerce Web site that allows the customer to click and generate a request for customer service. In step 710 the request for customer service is sent to the analytics engine and/or the merchant. The analytics engine at this point can determine if there is a rule for the customer that requires a specific level of customer support. In addition, or alternatively, the request can be displayed to the merchant via the merchant dashboard which may prompt the merchant to engage in real-time customer support (step 712). In step 714 the customer makes a buying decision. If the customer decides to leave the Web site without making a purchase, the process ends in step 718. If the customer decides to add an item to the shopping kart, in step 716 the analytics engine can trigger the recommendation engine to make an additional or complementary product or service recommendation.

Figure 8:
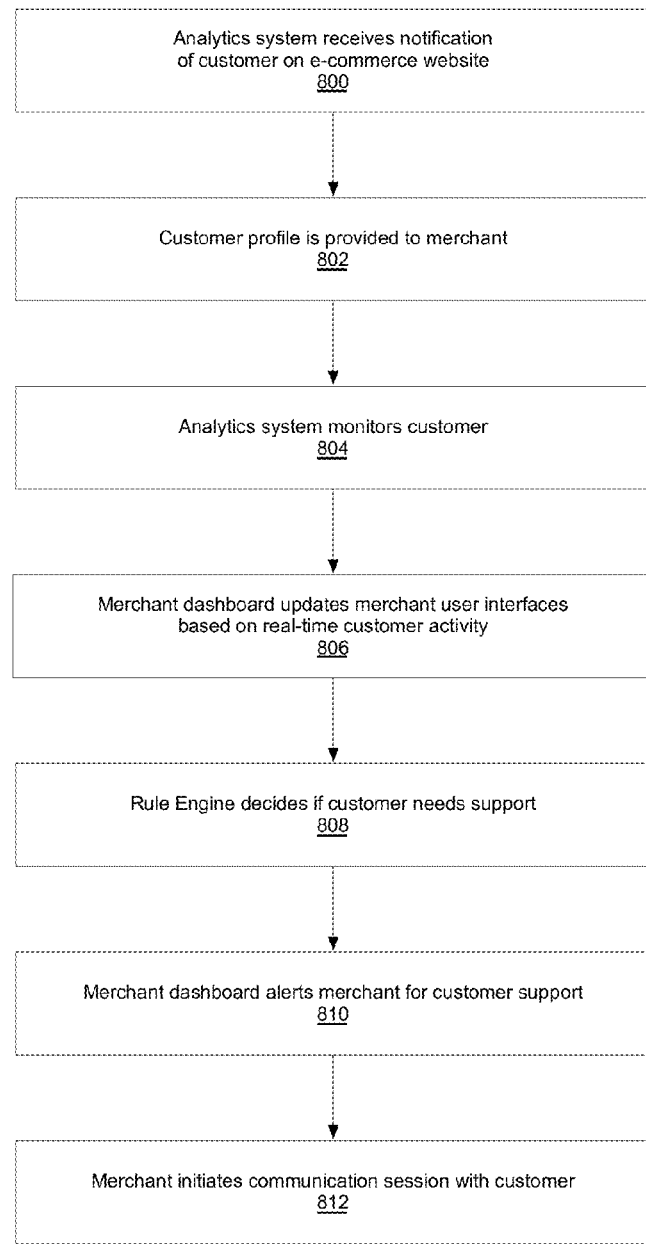
FIG. 8 is a flow diagram depicting a method for providing analytics and customer support features for a merchant interacting with a customer in real-time.

FIG. 8 shows a method flow for the analytics system to handle a request for customer service according to one embodiment of the invention. In step 800 the analytics system receives a notification of a customer presence on an e-commerce Web site. As previously discussed this notification may be triggered by cookies on the consumer's computer or through a login/password process. In step 802 the customer profile is searched by the analytics engine and provided to the merchant in real time user interfaces. In step 804 the analytics system continuously monitors the customer. According to the real-time aspect of this embodiment of the invention, the analytics engine requests pings from the customer web browser based on the activity of the customer. For example, if the customer has moved to a different product web page or is simply idle on a single web page, this information is constantly provided to the analytics engine and then to the merchant dashboard so the merchant can see the activity of the customer in real-time. In step 806 the merchant dashboard updates the merchant user interfaces based on the real-time activity registered by notifications received from the customer computer. In step 808 the rule engine may be invoked to determine if the customer needs support, e.g., if the merchant is not paying attention or is away from his monitoring station. If the rule engine decides that customer support is needed based on a predetermined criteria being satisfied, the rule engine will cause the analytics engine to command the merchant dashboard in step 810 to provide an alert to the merchant for providing customer support. The alert may be provided visually or by sound. This is analogous to when a customer rings a bell in a physical store to get the merchant's attention. In step 812, upon being alerted, the merchant may initiate a communication session with the customer to provide real-time customer support.

Turning now to FIG. 9, a first example of a user interface 900 adapted to allow a merchant administrator 312 to view real time information concerning activities of visitors to the subject Web site is presented. As discussed earlier, in one embodiment, the real-time analytics user interfaces are generated by the merchant dashboard engine 220. User interface 900 may be delivered in the form of a Web page, such as analytics page 320n, by a server, such as analytics system 208, to a Web site administrator client, such as merchant administrator 312, and rendered on a display thereof in a Web browser. Included in user interface 900 are various fields, including a visitor field 902, an activity field 904, and various history fields 906, 908, 910. Visitor field 902 includes, for each visitor to the subject Web site, identifying information of the visitor 912, which may be a visitor name or other identifying information received from the clients 314a-c associated with the visitor to the subject Web site, an indication of when the visitor is/was active on the subject e-commerce Web site 406 (and in some cases this may include information 914 identifying where the visitor arrived at the subject Web site from), and a jewel or other graphical element or icon 916.

The jewels 916 associated with the visitors are used in connection with the activity field 904 and may be grouped into various activity groups 918, 920, 922. Of course, these are merely examples of activity groups and in various embodiments, more or fewer activity groups may be used. In this example, activity group 918 identifies visitors to the site that are deemed to be "just browsing". Activity group 920 identifies those users considered to be "thinking" about making purchases. Activity group 922 identifies those users who are actually "buying" products for sale at the subject Web site. The associated visitor jewels are placed in the various activity groups by the analytics server according to the actual visitor behavior at the subject Web site. For example, "browsing" users may be those who recently arrived at the site, and/or those who do not manifest significant dwell time on any particular product pages. Those users who do linger on particular product pages for at least a specified time interval may be classified as "thinking" about purchase decisions and so their associated jewels may be moved from the browsing activity group to the thinking activity group. For visitors that have actually placed products in a virtual shopping cart or otherwise manifest a purchasing decision or intent, their associated jewels may be moved into the buying activity group. Regardless of the classifications and/or number of activity groups, the important thing to notice is that the classifications of the various visitors to the subject Web site for which user interface 900 is providing analytical information is being delivered in real time to the Web site administrator and so is available for real time use by that administrator. For example, the merchant or administrator may view the jewel and determine that the customer requires support. In some embodiments, the jewel may blink, flash or change color to alert the merchant that the customer requires support.

The information itself that is used to produce the analytical information may be derived from real time information collected by the analytics system 208 from the various visitor client machines 314*a*-*c*. When a visitor first reaches the subject Web site with their browser, the Web site delivers a cookie to the browser. The cookie includes a script that causes the browser to report certain information to the analytics system, where the information is logged and stored in database 304. The stored information can then be analyzed to provide the real time feedback exemplified in user interface 900. The use of cookies allows for unique visitor identification and tracking even where IP addresses are shared by groups of users or proxies. Nevertheless, in alternative embodiments. JavaScript on each page of the subject Web site could be used to notify the analytics system when a page is rendered by a visitor's Web browser. Both methods collect data that can be processed to produce the information described herein.

The history fields may include a recent history field 906, a past history field 908 and a referral field 910. The recent history field 906 may include information regarding recent visitors to the subject Web site. For example, in the illustration shown in FIG. 9, the recent history field shows the number of visitors to the subject Web site during the present day in running periods of quarter-hours, with the data represented in a histogram. Of course, other representations and/or statistics regarding recent visitors may be presented in lieu of or in addition to this visitor number data.

The past history field 908 may include information regarding past visitors to the subject Web site. For example, in the illustration shown in FIG. 9, the past history field shows the number of visitors to the subject Web site over the past day or so in running periods of quarter-hours, with the data represented in a histogram. Of course, other representations and/or statistics regarding recent visitors may be presented in lieu of or in addition to this visitor number data.

The referral field 910 provides real time information concerning Web locations where visitors to the Web site are originating from. This may include referrals from search engine search result pages, from direct entries of Web site URLs into browser address fields, and/or other referral pages. By understanding where current visitors to the site are originating from, the Web site administrator is provided a powerful tool to direct current advertising and/or marketing resources in order to reach the greatest number of potential customers and/or to allocate limited funds.

FIG. 10 illustrates further examples of user interfaces adapted to allow merchant administrators to view real time information concerning activities of visitors to the subject Web site. In FIG. 10, user interface 1000' includes the visitor field 1002, with visitors associated with identifying jewels, and the various activity groups 1018, 1020, 1022. In this example, however, the activity field 1004' includes additional items, including a gauge 1024 that shows the number of current active visitors and an indication of the relative number of new visitors to the number of repeat visitors (see the slider 1025 at the bottom of gauge 1024). The gauge may be configured to flash or adopt other visual indications when new visitors arrive at the Web site and/or existing visitors leave the subject Web site. Also, the activity field 1004' includes a new shopping cart indicator 1034 where, for a selected visitor, the number of items being purchased is represented as being present in the visitor's virtual shopping cart. The actual items so included in the shopping cart can be viewed in a purchasing field 1028 elsewhere on the page. In this example, graphical representations representing the items being purchased (e.g., images of the products from the subject Web page) are shown as being included in the user's shopping cart and the administrator can scroll to see which items are so included in the cart.

Another new field in user interface 1000' is a product view field 1026. In this field, real time information concerning which visitors are browsing which products is displayed. Notice that the jewels representing the visitors are arranged so as to be associated with the current product which the visitor is viewing in his/her Web browser. In addition, a total number of visitors viewing the subject product is provided.

The referral field 1010' again provides real time information concerning Web locations where visitors to the Web site are originating from and this time an associated keywords field 1030 is provided as well. Keywords field 1030 reports (e.g., using histograms, bar charts or other indicators) which keywords used in search engine queries are driving various numbers of visitors to the Subject Web site. This information can assist an administrator in making keyword purchase decisions. Further, a map 1032 illustrates in a highly intuitive fashion where the current Web site visitors are originating from.

In this example, the history field 1006 has been organized as a graph showing relative numbers of visitors over selected time periods (e.g., yesterday vs. today). Of course, other visitor number informational display means could be used.

Of course, many other informational representations may be provided in various configurations of the present user interfaces and the foregoing examples should not be read as limiting the present invention. In some instances, user classifications may be associated with the users, for example to indicate status as a loyal customer (e.g., one that makes frequent purchases), a discount customer (e.g., one that makes purchases only of sale items), an impulse buyer (e.g., one that adds items to shopping carts within a short period of time after arriving at the subject Web site), a needs-based buyer (e.g., one that arrived at the Web site though a specific keyword search and added the specified product to a shopping cart), and a wandering visitor (e.g., one that spent time viewing a number of different pages, but made no purchases).

As should be apparent from the foregoing discussion, various embodiments of the present invention may be implemented with the aid of computer-implemented processes or methods (i.e., computer programs or routines) or on any programmable or dedicated hardware implementing digital logic. Such processes may be rendered in any computer language including, without limitation, a object oriented programming language, assembly language, markup languages, and the like, as well as object-oriented environments such as the Common Object Request Broker Architecture (CORBA), Java™ and the like, or on any programmable logic hardware like CPLD, FPGA and the like.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied in the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments of the present invention can be implemented with apparatus to perform the operations described herein. Such apparatus may be specially constructed for the required purposes, or may be appropriately programmed, or selectively activated or reconfigured by a computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

It should be appreciated that the embodiments described above are cited by way of example, and that the present invention is not limited to what has been particularly shown and described hereinabove. Rather, the present invention includes both combinations and subcombinations of the various features described hereinabove, as well as variations and modifications thereof which would occur to persons skilled in the art upon reading the foregoing description and which are not disclosed in the prior art.

What is claimed is:

1. A system for real-time customer support for an e-commerce web site comprising:
    an analytics system for use in providing real-time customer support to a customer browsing an e-commerce website of a merchant at a display, the analytics system comprising one or more server computers capable of being coupled, via a network, to a computer or a computing device of the customer, and to a computer or a computing device of a merchant administrator of the merchant, the one or more server computers of the analytics system being configured to:
        continuously monitor digital data streams, wherein monitoring the digital data streams comprises real-time monitoring, sensing, and determining transmitted customer communications data comprising data on customer browsing activities at the website and customer profile information, and process for display to the merchant administrator through an analytics user interface generated at the computer or the computing device of the merchant administrator, real-time news, determined based on the transmitted customer communications data, of browsing activities of the customer browsing the e-commerce website as well as obtained profile information about the customer;
        mine data from one or more other websites by continuously monitoring and determining, in real-time, customer trend information, the customer trend information being determined based on activities of one or more other customers at the one or more other websites;
        dynamically generate or adapt at least one rule defining whether a communication comprising a deal or recommendation should be initiated with the customer based on the customer trend information, the transmitted customer communications data, and one or more previously defined rules for deals or recommendations offered on the e-commerce website;
        determine to automatically initiate, or determine to recommend to initiate, an automatic communication with the customer in response to a notification or alert from the website that the customer is currently present at the website and in accordance with the at least one dynamically generated or adapted rule; and
        communicate real-time support information connected with the customer's activities at the e-commerce website to the computer or computing device of the merchant administrator during a user interface-based real-time interaction between the merchant administrator and the customer by causing the display of the analytics user interface or a display of a generated customer support user interface provided to the customer to dynamically generate or change one or more icons relating to the real-time support information, wherein the real-time support information is based at least in part on the profile information, a deal or recommendation invoked based on the customer trend information and the real-time news.

2. The system of claim 1, wherein the analytics system comprises a real-time customer support engine for use in providing the real-time support.

3. The system of claim 1, wherein the profile information includes information about the customer uploaded from one or more social networking accounts of the customer.

4. The system of claim 1, wherein the analytics user interface and the customer support user interface are customized and personalized to the customer based at least in part on the profile information and the real-time news.

5. The system of claim 1, wherein the real-time support is in connection with a potential purchase by the customer at the website.

6. The system of claim 1, wherein the real-time support includes providing a customized and personalized deal or recommendation to the user.

7. The system of claim 1, wherein the analytics system includes a rule-based analytics engine for analyzing customer profile and real-time browsing activity information to determine to automatically initiate, or to determine to recommend to initiate, real-time support.

8. The system of claim 1, wherein the analytics system includes a rule-based analytics engine for analyzing customer profile and real-time browsing activity information in determining alerts or notifications to be provided by the analytics system, to the customer or the merchant administrator, in connection with initiating a support interaction or recommending initiation of a support interaction.

9. The system of claim 1, wherein the analytics system includes a rule-based analytics engine for analyzing customer profile and real-time activity information in determining alerts or notifications to be provided by the analytics system, to the customer or the merchant administrator, and wherein the analytics system determines, and alerts the merchant administrator to, a level of support determined to be required by the customer, and provides customer preference information, to the merchant administrator, that may be utilized in determining and providing the real-time support.

10. The system of claim 9, wherein alerts or notifications can be visual or audio and can be provided via SMS, email or instant message.

11. The system of claim 1, wherein, the analytics user interface comprises a merchant dashboard through which the merchant administrator can perform real-time monitoring of activities of multiple customers on the website, including the customer.

12. The system of claim 1, wherein, via the analytics user interface, the merchant administrator can monitor multiple customers, including the customer, in real time, and wherein the analytics user interface includes graphical representations of each of the multiple customers, including the customer.

13. The system of claim 1, wherein, via the analytics user interface, the merchant administrator can monitor multiple customers, including the customer, in real time, and wherein the analytics user interface includes graphical representations of each of the multiple customers, including the customer, and wherein graphical representations may indicate a determined state of the customer relative to a purchase or potential purchase.

14. The system of claim 1, wherein, via the analytics user interface, the merchant administrator can monitor multiple customers, including the customer, in real time, and wherein the analytics user interface includes icons representing of each of the multiple customers.

15. The system of claim 1, wherein, via the customer support interface, the customer is provided with one or more graphical representations of the merchant administrator.

16. The system of claim 1, wherein the real-time support can include the use of a text-to-speech system in providing spoken versions of text messages from the merchant administrator to the customer.

17. A method for use in automatically initiating real-time customer support for an e-commerce website of a merchant at a display of a computer or computing device of the customer, the method comprising:
continuously monitoring digital data streams, wherein monitoring the digital data streams comprises real-time monitoring, sensing, and determining transmitted customer communications data comprising data on customer browsing activities at the website and customer profile information, and process for display to the merchant administrator through an analytics user interface generated at the computer or the computing device of the merchant administrator, real-time news, determined based on the transmitted customer communications data, of browsing activities of the customer browsing the e-commerce website as well as obtained profile information about the customer;
mining data from one or more other web sites by continuously monitoring and determining, in real-time, customer trend information, the customer trend information being determined based on activities of one or more other customers at the one or more other web sites;
dynamically generating or adapting at least one rule defining whether a communication comprising a deal or recommendation should be initiated with the customer based on the customer trend information, the transmitted customer communications data, and against one or more previously defined rules for deals or recommendations offered on the e-commerce web site;
determining to automatically initiate, or determining to recommend to initiate, an automatic communication with the customer in response to a notification or alert from the web site that the customer is currently present at the web site and in accordance with the at least one dynamically generated or adapted rule; and
communicating real-time support information connected with the customer's activities at the e-commerce website to the computer or computing device of the merchant administrator during a user interface-based real-time interaction between the merchant administrator and the customer by causing the display of the analytics user interface or a display of a generated customer support user interface provided to the customer to dynamically generate or change one or more icons relating to the real-time support information, wherein the real-time support information is based at least in part on the profile information, a deal or recommendation invoked based on the customer trend information and the real-time news.

18. The method of claim 17, comprising:
a computer-based analytics system determining that a customer is visiting the website;
the computer-based analytics system obtaining profile information, including past browsing information, about the customer;
the computer-based analytics system performing continuous, real-time monitoring of browsing activities of the customer on the website to obtain browsing activity information, storing the browsing activity information in an analytics database, and providing at least some of the browsing activity information to the merchant administrator via an analytics user interface; and
the computer-based analytics system providing an alert to the merchant administrator when a determination is made that the customer requires real-time support.

19. The method of claim 18, comprising:
the computer-based analytics system determining, based at least in part on analysis of the profile information and the browsing activity information, a level of support required by the customer; and
the computer-based analytics system notifying the merchant administrator of the determined level of support.

20. A computer program product embedded in a non-transitory computer readable medium or media comprising an executable program for automatically initiating real-time customer support for an e-commerce web site of a merchant at a display of a computer or a computing device of the customer, which, when executed by one or more computers, performs a method comprising:
- continuously monitoring digital data streams, wherein monitoring the digital data streams comprises real-time monitoring, sensing, and determining transmitted customer communications data comprising data on customer browsing activities at the website and customer profile information, and process for display to the merchant administrator through an analytics user interface generated at the computer or the computing device of the merchant administrator, real-time news, determined based on the transmitted customer communications data, of browsing activities of the customer browsing the e-commerce website as well as obtained profile information about the customer;
- mining data from one or more other web sites by continuously monitoring and determining, in real-time, customer trend information, the customer trend information being determined based on activities of one or more other customers at the one or more other web sites;
- dynamically generating or adapting at least one rule defining whether a communication comprising a deal or recommendation should be initiated with the customer based on the customer trend information, the transmitted customer communications data, and one or more previously defined rules for deals or recommendations offered on the e-commerce web site;
- determining to automatically initiate, or determining to recommend to initiate, an automatic communication with the customer in response to a notification or alert from the web site that the customer is currently present at the web site and in accordance with the at least one dynamically generated or adapted rule; and
- communicating real-time support information connected with the customer's activities at the e-commerce website to the computer or computing device of the merchant administrator during a user interface-based real-time interaction between the merchant administrator and the customer by causing the display of the analytics user interface or a display of a generated customer support user interface provided to the customer to dynamically generate or change one or more icons relating to the real-time support information, wherein the real-time support information is based at least in part on the profile information, a deal or recommendation invoked based on the customer trend information and the real-time news, and
- wherein the computer-based analytics system analyzes customer profile information, customer trend information and real-time activity information in determining, and alerting the merchant administrator, when support is required by the customer, and what level of support is required by the customer.

* * * * *